(12) United States Patent
Akyurt et al.

(10) Patent No.: US 10,280,045 B2
(45) Date of Patent: May 7, 2019

(54) HUMAN TRANSPORT DEVICE HAVING A MONITORING APPARATUS

(71) Applicants: THYSSENKRUPP ELEVATOR AG, Essen (DE); thyssenkrupp AG, Essen (DE)

(72) Inventors: Irfan Akyurt, Hamburg (DE); Christopher Busemann, Hamburg (DE); Aurelio Castaño Lantero, Langreo (ES)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/750,462

(22) PCT Filed: Aug. 2, 2016

(86) PCT No.: PCT/EP2016/068391
§ 371 (c)(1),
(2) Date: Feb. 5, 2018

(87) PCT Pub. No.: WO2017/021393
PCT Pub. Date: Feb. 9, 2017

(65) Prior Publication Data
US 2018/0237270 A1    Aug. 23, 2018

(30) Foreign Application Priority Data

Aug. 3, 2015  (DE) .................. 10 2015 214 764
Jun. 10, 2016  (ES) ............................. 201630799

(51) Int. Cl.
*B65G 43/06*    (2006.01)
*B65G 43/10*    (2006.01)
(Continued)

(52) U.S. Cl.
CPC ............ *B66B 29/005* (2013.01); *B65G 43/06* (2013.01); *B65G 43/10* (2013.01); *B66B 25/006* (2013.01)

(58) Field of Classification Search
CPC ..... B66B 29/005; B66B 25/006; B65G 43/06; B65G 43/10
See application file for complete search history.

(56) References Cited

U.S. PATENT DOCUMENTS 5,096,040 A  *  3/1992  Wente .................. B66B 29/005
                                                            198/323
5,236,075 A  *  8/1993  Bartmann ............. B66B 29/005
                                                            198/323

(Continued)

FOREIGN PATENT DOCUMENTS

CN        201321338 Y      10/2009
CN        201362542 Y      12/2009
(Continued)

OTHER PUBLICATIONS

English Translation of International Search Report issued in PCT/EP2016/068391, dated Nov. 3, 2016 (dated Nov. 14, 2016).
(Continued)

*Primary Examiner* — Mark A Deuble
(74) *Attorney, Agent, or Firm* — thyssenkrupp North America, Inc.

(57) ABSTRACT

A human transport device such as an escalator or a moving walkway may include tread elements connected into an endless transport belt, a drive unit for driving the transport belt, and a monitoring apparatus for detecting a faulty arrangement of at least one of the tread elements in the transport belt. The tread elements of the driven transport belt may pass through a transport region and a return region between a first return station and a second return station. The monitoring apparatus may have a detection means and a
(Continued)

triggering unit. The detection means may be arranged in a direction of a longitudinal extension of the human transport device below the tread elements of the transport region between the first and second return stations. The detection means may be connected to the triggering unit, and the triggering unit may actuate upon mechanical influence on the detection means.

20 Claims, 11 Drawing Sheets

(51) Int. Cl.
  *B66B 25/00* (2006.01)
  *B66B 29/00* (2006.01)

(56) References Cited

U.S. PATENT DOCUMENTS

| | | | |
|---|---|---|---|
| 5,842,554 A | 12/1998 | Stoxen et al. | |
| 7,225,912 B1 * | 6/2007 | Toennisson | B66B 27/00 198/323 |
| 2003/0136635 A1 | 7/2003 | Lauch | |
| 2008/0135376 A1 * | 6/2008 | Hauser | B66B 23/14 198/322 |
| 2008/0164118 A1 * | 7/2008 | Gonzalez Alemany | B66B 21/12 198/323 |
| 2013/0153362 A1 | 6/2013 | Gonzalez Alemany | |
| 2015/0203330 A1 | 7/2015 | Ischganeit | |
| 2015/0274490 A1 | 10/2015 | Vlad | |
| 2016/0304323 A1 * | 10/2016 | Fukutani | B66B 29/005 |

FOREIGN PATENT DOCUMENTS

| | | |
|---|---|---|
| CN | 203998570 U | 12/2014 |
| DE | 226853 A | 9/1985 |
| DE | 4219073 A | 12/1993 |
| DE | 9218928 U | 3/1996 |
| EP | 0379027 A | 7/1990 |
| EP | 1939127 A | 7/2008 |
| JP | H08169679 A | 7/1996 |
| JP | 2001080865 A | 3/2001 |
| JP | 2003063765 A | 3/2003 |
| WO | 2015102031 A | 7/2015 |

OTHER PUBLICATIONS

English language Abstract for JP 2001080865 A.
English language Abstract for JP 2003063765 A.

* cited by examiner

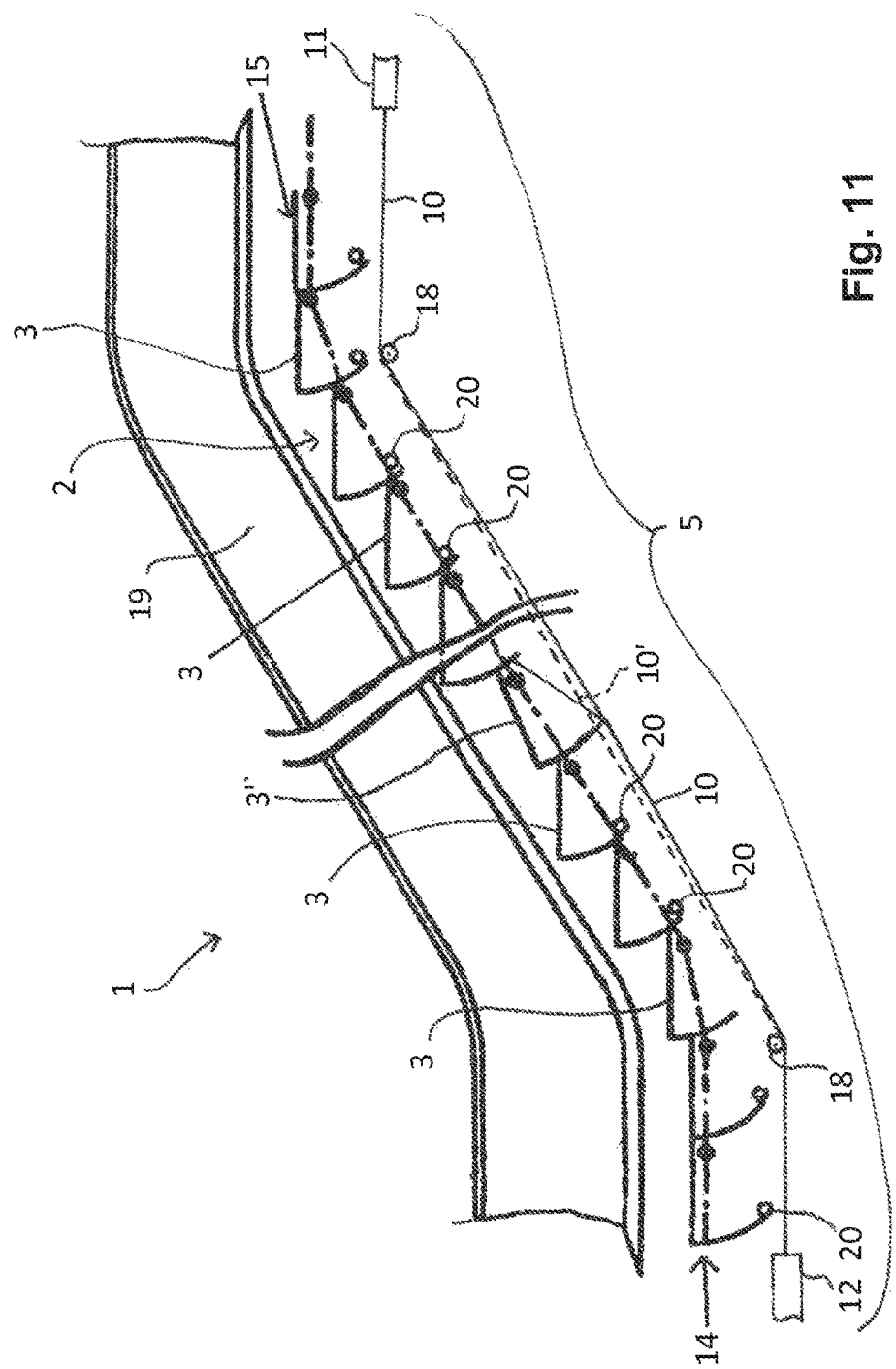

HUMAN TRANSPORT DEVICE HAVING A MONITORING APPARATUS

CROSS REFERENCE TO RELATED APPLICATIONS

This application is a U.S. National Stage Entry of International Patent Application Serial Number PCT/EP2016/068391, filed Aug. 2, 2016, which claims priority to Spanish Patent Application No. ES 20160030799, filed Jun. 10, 2016, and to German Patent Application No. DE 10 2015 214 764.9, filed Aug. 3, 2015, the entire contents of both of which are incorporated herein by reference.

FIELD

The present disclosure generally relates to human transportation devices, including escalators and travellators with multiple tread elements.

BACKGROUND

If the human transport device is an escalator, a transport belt is thus formed as an endless step belt from a plurality of steps as tread elements. If the human transport device is a travellator, a transport belt is thus formed as an endless pallet belt from a plurality of pallets as tread elements.

If the human transport device is an escalator, the first return station is usually disposed on a first building floor plane and the second return station is usually disposed on a second building floor plane, wherein the second building floor plane lies higher or lower in relation to the first building floor plane. The human transport device in this case thus has an upper return station and a lower return station. In this case, it is in particular usual that the upper return station for driving the step belt of the escalator is connected to the drive unit by way of a gearbox. If the human transport device is a travellator, a front return station and a rear return station are usually provided as the first return station and the second return station, respectively.

The transport region of the human transport device is that region in which users of the human transport device are transported, thus in particular that region that can be walked on by users. By contrast, the return region of the human transport device is usually that region in which the tread elements are returned back to the beginning of the transport region again, and which is usually not visible to the users. However, the reversal of direction in the case of some human transport devices is performed horizontally such that the return region is disposed in the same plane as the transport region. In such cases, the return region is also used for the transport region, the return region in these cases thus moreover being a transport region.

The tread elements in the transport region and return region to this extent have opposite directions of movement. The respective change in the direction of movement of the tread elements from the transport region to the return region and from the return region to the transport region herein is implemented by the return stations.

In the operation of a human transport device, a breakage of a tread element or breakage of a holding element or of a track roller of the tread element can in particular lead to a faulty arrangement of a tread element. A faulty arrangement of a tread element herein leads in particular to the tread element being lowered or released from the transport belt and thereby can result in the transport belt being interrupted, in particular opened. Since such a faulty arrangement of a tread element represents a risk potential both for the faultless further operation of the human transport device as well as for the users of the human transport device, an early identification of such a faulty arrangement is of importance.

It is known for monitoring apparatuses to be used for identifying a faulty arrangement of a tread element. For example, if a breakage of a tread element is identified by means of the monitoring device, the human transport device can be taken out of operation.

A monitoring apparatus for identifying breakages in steps in the case of escalators is known, for example from the publication JP 08169679 A. Images of the steps are acquired by photo technology herein. The acquired images are subjected to a comparison with images of faultless steps in order for a fault to be detected. This monitoring herein is technically complex to implement and is thus cost-intensive. Moreover, correct monitoring is no longer provided in the case of a contamination of the camera lens.

Furthermore, a monitoring apparatus for a transport means, in particular for an escalator having an inclined step belt, guided on chains, and having endlessly revolving steps, is known from DE 42 19 073 A1. The monitoring apparatus herein comprises a light barrier wherein the light beam of the light barrier runs at a tight spacing below the steps of the step track and is directed so as to be parallel with the direction of movement of the step track. The drive of the step track is switched off as soon as an interruption of the light beam takes place on account of a step being lowered. A disadvantage of the monitoring apparatus proposed lies in that it is not uncommon for an interruption of the light beam to take place for other reasons than that of a step being lowered. In particular, an interruption of the light beam can be caused by the ingress of foreign matter such as leaves or trash, or else by dust or small animals such as insects. Correct monitoring is no longer provided in this instance.

Thus a need exists for a human transport device with a view to a faulty arrangement of a tread element such as, in particular, a lowered step, being identified in a more reliable manner. The identification of a faulty arrangement herein should advantageously moreover be implementable in a cost-effective manner.

BRIEF DESCRIPTION OF THE FIGURES

FIG. 11 is a schematic view of yet a further example human transport device.

DETAILED DESCRIPTION

Figure 1:
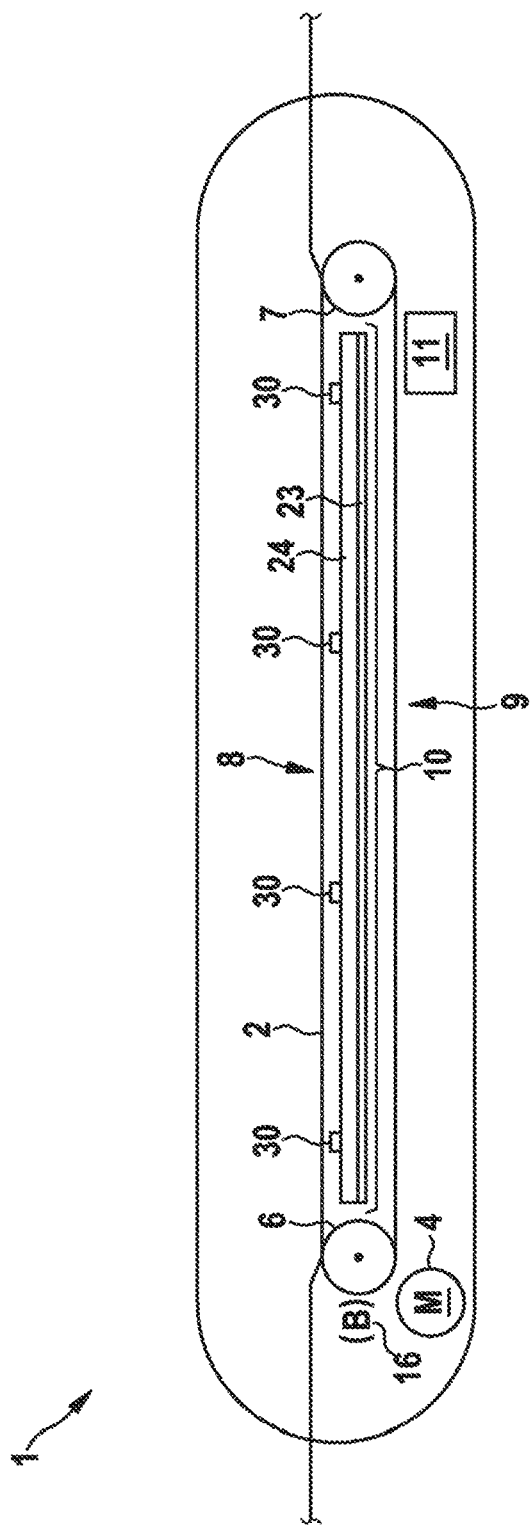
FIG. 1 is a schematic view of an example human transport device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to human transport devices, including escalators and travellators, for example. In some examples, a human transport device may comprise a plurality of tread elements that are connected so as to form an endless transport belt, at least one drive unit for driving the transport belt, and a monitoring apparatus for identifying a faulty arrangement of at least one tread element in the transport belt. The tread elements of the driven transport belt between a first return station and a second return station herein run through a transport region and a return region.

A human transport device, in particular an escalator or a travellator, may comprise a plurality of tread elements that are connected so as to form an endless transport belt, at least one drive unit for driving the transport belt, and a monitoring apparatus for identifying a faulty arrangement of at least one tread element in the transport belt, wherein the tread elements of the driven transport belt between a first return station and a second return station run through a transport region and a return region. The monitoring apparatus herein may have at least one detection means and at least one triggering unit, wherein the at least one detection means in the direction of longitudinal extent of the human transport device is disposed between the first return station and the second return station, so as to be below the tread elements of the transport region. The at least one detection means may be connected to the at least one triggering unit, wherein the at least one triggering unit is configured to be triggered in the event of a mechanical action on the at least one detection means.

Since a faulty arrangement of a tread element is caused by said tread element being lowered, an misplaced tread element affects the detection means. A detectable mechanical action is thus performed on the detection means. The mechanical action on the at least one detection means herein leads in particular to a deformation or to a deflection, respectively, of the detection means. Since the detection means is connected to at least one triggering unit, that is to say that the detection means is operatively connected to the triggering unit, the triggering unit is advantageously triggered by the mechanical action, in particular by the deformation or the deflection, respectively, of the detection means. A faulty arrangement of a tread element is thus advantageously identified by way of the mechanical action on the detection means. It is provided in particular herein that a signal which is received by the triggering unit and initiates the triggering of the latter is generated by way of the mechanical action on the detection means. The signal which is generated by way of the mechanical action on the detection means herein can in particular be a mechanical or an electrical signal.

The proposed solution herein is advantageously implementable in a cost-effective manner and moreover has a low susceptibility to damage in terms of contaminations or foreign matter that enters the human transport device. For example, leaves or small animals are thus too light for deforming or deflecting the detection means. To this extent, no mechanical action on the detection means that would lead to the triggering unit being triggered is performed in particular by invading leaves, contaminations, or small animals.

Moreover, the proposed solution is advantageously resistant to aging since said solution in terms of the functioning thereof is not impeded by dust or other contaminations as is the case with a light barrier or a photo-based detection. Correct monitoring of a faulty arrangement of a tread element is by way of the proposed solution thus advantageously enabled also over a long period of time.

One advantageous embodiment of the proposed human transport device provides that the detection means is disposed between the first return station and the second return station, so as to be centric to the tread elements. It is provided in particular that the detection means in the direction of longitudinal extent of the human transport device is disposed between the first return station and the second return station, so as to be symmetrical in relation to the center of the tread elements. A particularly good identification capability of a faulty arrangement of a tread element is advantageously enabled by the centrical or symmetrical, respectively, disposal of the detection means.

Various variants in terms of the embodiment of the at least one detection means can be provided. It is critical that the triggering unit is triggered in the event of a mechanical action on the at least one detection means, said mechanical action in particular causing a deformation or a deflection of the detection means.

One advantageous embodiment of the proposed solution provides that the at least one detection means under tensile stress is disposed between the first return station and the second return station, so as to be below the tread elements of the transport region, wherein the at least one triggering unit is configured to be triggered in the event of a deflection of the at least one detection means by a mechanical action on the at least one detection means.

The detection means herein in the direction of longitudinal extent of the human transport device is thus mechanically tensioned between the first return station and the second return station. The detection means herein, in the direction of longitudinal extent of the human transport device between the first return station and the second return station, can be disposed merely below a portion of the transport region. However, the detection means in the direction of longitudinal extent of the human transport device is preferably tensioned below the entire transport region. A faulty arrangement of a tread element is advantageously identified across the entire transport region on account thereof. In order for a faulty arrangement of a tread element in the transport belt to be particularly readily identified, the detection means is preferably tensioned a few centimeters below the tread elements of the transport region.

In the case of such an embodiment, the triggering unit is advantageously triggered by way of a deflection of the detection means, or by way of the increase in the tensile stress of the tensioned detection means, respectively. A faulty arrangement of a tread element is thus advantageously identified by way of the deflection of the detection means.

If the human transport device is an escalator, the first return station is usually disposed on a first building floor plane, and the second return station is disposed on a second building floor plane, wherein the second building floor plane lies higher or lower in relation to the first building floor plane. The human transport device in this case thus has one upper return station and one lower return station. It is provided herein in particular that the upper return station for driving the step belt of the escalator is connected to the drive unit by way of a gearbox.

If the human transport device is a travellator, a front return station and a rear return station are provided in particular as the first return station and the second return station, respectively.

According to one further advantageous embodiment of the invention, it is provided that the detection means is tensioned between at least one holding element and the at least one triggering unit. The at least one holding element and the at least one triggering unit herein are disposed between the first return station and the second return station. The detection means is thus also disposed between the first return station and the second return station. A hook or an eyelet can be provided as the holding element, for example. The holding element herein is preferably configured so as to be metallic.

One advantageous refinement of this embodiment provides that the human transport device connects a first height level to a second height level, wherein the second height level lies higher than the first height level, wherein the at least one triggering unit is disposed in the region of the second height level. The at least one holding element is thus disposed in the region of the first height level. It has been demonstrated that a particularly good identification capability of misplaced tread elements is provided in the case of such an arrangement.

One advantageous design variant of the invention provides that the monitoring apparatus of the human transport device has at least one first triggering unit and at least one second triggering unit, wherein the detection means is tensioned between the at least one first triggering unit and the at least one second triggering unit. This variant of design embodiment advantageously further improves the identification capability of misplaced tread elements.

According to one advantageous variant of design embodiment it is provided that the at least one detection means comprises at least one mechanically tensioned cable, in particular a steel cable, or is configured as a mechanically tensioned cable, respectively, wherein the at least one mechanically tensioned cable is deflected in the event of a mechanical action and triggers the at least one triggering unit at a pre-determined deflection. The at least one detection means is advantageously disposed under tensile stress between the first return station and the second return station, so as to be below the tread elements of the transport region, wherein the detection means is advantageously disposed as a cable, in particular a steel cable. The at least one triggering unit herein is advantageously configured to be triggered in the event of a deflection of the detection means by way of a mechanical action on the detection means by a misplaced tread element. In the case of a design embodiment of the at least one detection means as a tensioned cable, for example as a tensioned steel cable, the mechanical action on the cable causes an increase in the tensile stress of the cable, on account of which a triggering unit is advantageously made to trigger. The at least one cable herein can be guided, advantageously by way of deflection rollers or by a receptacle space of corresponding design.

A particularly cost-effective embodiment of the invention provides that the detection means is formed from at least one cable. It is provided in particular that the detection means is a cable which under tensile stress is disposed between the first return station and the second return station, so as to be below the tread elements, in particular is thus mechanically tensioned between a holding element and a triggering unit, or between two triggering units. Design embodiments of the invention, having a plurality of cables tensioned beside one another as the detection means herein advantageously have a further improved identification capability of misplaced tread elements. Design embodiments in which each cable is connected to in each case at least one triggering unit, as well as design embodiments in which a plurality of cables or all cables are connected to one triggering unit, are provided herein.

In the case of one further advantageous embodiment, the detection means is formed from a net. It is provided in particular that the detection means is a net that is tensioned between at least one triggering unit and one holding element, or a net that is tensioned between at least two triggering units. The identification capability of a misplaced tread element is fundamentally even further improved on account thereof. Further defects, for example when part of a tread element breaks away during the operation of the escalator and drops onto the detection means, can in particular be identified on account thereof. Moreover, foreign matter such as leaves, flyers, or small parts, that have invaded the human transport device can be caught by the detection means and thus advantageously do not make their way into the mechanism of the human transport device. Since foreign matter of this type is substantially lighter than a tread element of the human transport device, at least one triggering unit is advantageously configurable in such a manner that said triggering unit is triggered only when a tread element is lowered or breaks and consequently impacts and deflects the detection means.

In particular in the case of embodiments according to the invention which provide that the detection means is formed from at least one cable or from at least one net, it is advantageously provided that the detection means comprises at least one steel cable. The detection means is advantageously configured so as to be particularly robust and durable on account thereof.

In the case of one further advantageous embodiment of the human transport device according to the invention it is provided that the human transport device has a compensation means which is configured for compensating a decrease in the tensile stress of the tensioned detection means. The compensation means herein can comprise spring elements, for example, which ensure a consistent tensile stress even over comparatively long periods of time. Alternatively or additionally, set screws which, if required, can in particular be readjusted in routine maintenance work so as to counteract any decrease in the tensile stress can be provided. The at least one triggering unit is advantageously configured to detect and signal a decrease in the tensile stress. One further advantageous design embodiment provides that the triggering unit establishes a correction factor that is determined so as to depend on predefined parameters such as temperature or temporal period, said correction factor advantageously taking into account a variation in the tensile stress that is associated with said parameters. The identification of faults in terms of misplaced tread elements are advantageously even further reduced on account thereof.

According to one further advantageous embodiment of the invention, the at least one triggering unit of the monitoring apparatus is configured to be triggered in the event of a decrease in the tensile stress of the detection means, in particular in the event of a rupture of the detection means. As a design variant it is provided to this end that the monitoring apparatus of the human transport device comprises a further, thus an additional, triggering unit which is configured to be triggered in the event of a decrease in the tensile stress of the detection means and thus in particular in the event of a rupture of the detection means. Should the detection means, in particular when configured as a cable, be severed by a broken tread element, an additional safety measure is thus advantageously provided in order for a faulty arrangement of a tread element to be identified. Moreover, also the unlikely case of the detection means having to be re-tensioned is advantageously identifiable on account thereof. The overall reliability of the identification of a misplaced tread element is thus even further enhanced.

One further advantageous embodiment of the human transport device according to the invention provides that the transport belt of the human transport device in the transport region runs in at least two different planes, wherein the human transport device has deflection means by way of which the detection means is guided such that a uniform spacing between tread elements and detection means is maintained in the different planes. A reliable and consistent identification of a faulty arrangement of at least one tread element is advantageously enabled across the entire transport region even in the case of human transport devices, in particular escalators, that are configured in a curved or cascade-type manner on account thereof. If the detection means is configured as a cable, the deflection means can in particular be a roller across which the cable is guided. If the detection means comprises a plurality of cables, a corresponding plurality of rollers are to be provided. The at least one cable as the detection means can in particular also be guided in a receptacle space that is configured in the direction of longitudinal extent of a damper element that is yet to be described hereunder.

The at least one triggering unit of the human transport device according to the invention is advantageously a micro switch or a strain sensor, in particular when the detection means comprises at least one cable or is formed from at least one cable. A micro switch herein is an electric switch, in particular a terminal position switch. If the contacts of said micro switch are opened, presently in the case when the detection means is deflected by way of a tread element sinking, the contacts usually have a mutual spacing of less than 3 mm. Advantages of micro switches or strain sensors as triggering units are in particular the robust construction which offers high reliability, and the low price. It is provided as a further advantageous embodiment that the at least one triggering unit is a control apparatus, in particular a correspondingly specified microcontroller.

One further advantageous design variant provides that the at least one detection means comprises a capacitive proximity sensor, the capacitance thereof varying in the event of a mechanical action on the detection means, wherein the at least one triggering unit is triggered at a pre-determined capacitance variation.

According to a further advantageous embodiment, the at least one detection means has an inductive proximity sensor, the induction thereof varying in the event of a mechanical action on the detection means, wherein the at least one triggering unit is triggered at a pre-determined induction variation.

It is furthermore provided as a further advantageous design variant that the at least one detection means has a resistance sensor, the resistance thereof varying in the event of a mechanical action on the detection means, wherein the at least one triggering unit is triggered at a pre-determined resistance variation.

In the case of one further advantageous design variant it is provided that the at least one detection means comprises an optical sensor comprising an elastically deformable light conductor, the measured values thereof varying in the event of a mechanical action on the light conductor, wherein the at least one triggering unit is triggered at a pre-determined measured-value variation.

In the case of one further advantageous alternative embodiment the at least one detection means comprises a flow sensor comprising a fluid-perfused elastically deformable hose, the measured-flow values thereof varying in the event of a mechanical action on the hose, wherein the at least one triggering unit is triggered at a pre-determined variation of the measured-flow values. The hose herein in the direction of longitudinal extent of the human transport device advantageously extends between the first return station and the second return station, so as to be below the tread elements of the transport region, and is perfused by a suitable medium. A variation of the flow which is caused by the deformation of the elastic hose initiated by the mechanical action of a sinking tread element is advantageously detected herein and thus advantageously causes the triggering unit to be triggered.

One further particularly advantageous design variant provides that the at least one detection means comprises at least one acceleration sensor, in particular comprises an acceleration sensor that is disposed on a vibration transmitter, the measured-acceleration values of said acceleration sensor varying in the event of a mechanical action on the vibration transmitter, wherein the at least one triggering unit is triggered at a pre-determined variation of the measured-acceleration values. This design embodiment is advantageously particularly cost-effective. A metal profile and/or a damper element are/is provided as the vibration transmitter, in particular. The vibration transmitter is advantageously a damper element that is attached to a metal profile. The sinking of a tread element onto the vibration transmitter herein generates vibrations which are advantageously detected as a variation of the measured-acceleration values by the at least one acceleration sensor and thus cause the triggering unit to be triggered.

According to one design variant of the invention, the detection means in the direction of longitudinal extent of the human transport device can be disposed between the first return station and the second return station so as to be only below a portion of the transport region. However, the detection means in the direction of longitudinal extent of the human transport device is preferably disposed below the entire transport region. A faulty arrangement of a tread element is advantageously identified across the entire transport region on account thereof. A disposal of the at least one detection means below the transport region means in particular that the at least one detection means is disposed between the transport region and the return region, thus below the tread elements of the transport region but above the tread elements of the return region.

For a particularly positive identification of a faulty arrangement of a tread element in the transport belt, the detection means is preferably disposed a few centimeters below the tread elements of the transport region. According to one further advantageous embodiment it is furthermore provided that the at least one detection means is disposed in an equidistant manner between the first return station and the second return station, so as to be below the tread elements of the transport region. A faulty arrangement of a tread element across the entire detection region is advantageously identified to the same extent on account thereof. A reliable and consistent identification of a faulty arrangement of at least one tread element is advantageously enabled across the entire transport region even in the case of human transport devices, in particular escalators, that are configured in a curved or cascade-type manner on account thereof. If the detection means is configured as a cable, deflection means, such as in particular a guide or rollers, across which the rope is guided, are provided in order to maintain the consistent spacing. If the detection means comprises a plurality of cables, a corresponding plurality of deflection means are to be provided.

According to one advantageous embodiment of the proposed human transport device it is provided in particular that the monitoring apparatus of the human transport device has exactly one detection means and exactly one triggering unit.

One further particularly advantageous design embodiment of the human transport device according to the invention provides that the detection means is disposed on at least one damper element or is disposed within at least one damper element. It is provided in particular that the at least one detection means is guided within the damper element, preferably in a receptacle space that is provided therefor. The at least one damper element is advantageously disposed between the first return station and the second return station, so as to be below the tread elements of the transport region. The at least one damper element is particularly preferably disposed below the entire transport region. The damper element can in particular be configured in the manner of a hose.

The at least one damper element advantageously comprises at least one damper part from an elastically deformable material, in particular from an elastically deformable plastic, that extends across the longitudinal extent of the damper element. It is provided in particular as an advantageous design embodiment that the damper part is the damper element, the damper element thus being an elastically deformable material, in particular an elastically deformable plastic.

According to one further advantageous design embodiment it is provided that the at least one damper part has at least two lateral support walls, a compression space which in the event of a mechanical action by a sinking tread element is compressed being configured in the direction of the longitudinal extent of the damper element, so as to be between said two lateral support walls. The compression space herein can in particular be a cavity. Alternatively, the compression space can be filled with a compliant material, for example a foam. A more intense compression of the damper element in the event of a tread element sinking is advantageously enabled by way of the compression space such that the sunken tread element is better damped, on the one hand. Moreover, the identification of a faulty arrangement of a tread element can be advantageously improved since the compression travel, thus the distance between the upper position of the damper element in the absence of mechanical action, and the upper position of the damper element in the event of mechanical action, in particular in the event of a tread element bearing thereon, is enlarged. The at least one detection means herein is advantageously disposed above the compression space, so as to be on or within the damper element.

In the case of one further advantageous design embodiment of the proposed human transport device, the at least one damper element is disposed on at least one support element, in particular on top of at least one support element. On account thereof, the at least one damper element can advantageously track the profile of the transport belt of the human transport device in a particularly positive manner, in particular such that a minor equidistant spacing between tread elements of the transport region and the damper element is implemented.

One advantageous refinement of this embodiment exploits the fact that a human transport device mentioned at the outset usually has at least one support structure, in particular a support structure having a lattice structure, the transport belt of the human transport device being guided within said support structure. The at least one support element herein is advantageously connected to the at least one support structure. It is provided herein in particular that the at least one support element is disposed on cross stays of the support structure that are disposed so as to be transverse or vertical, respectively, in relation to the direction of longitudinal extent of the human transport device.

The at least one support element is advantageously a metal profile which is disposed on the support structure and on which the at least one damper element is disposed. The metal profile herein can in particular be a steel support or a steel rail. It is in particular provided as one advantageous embodiment that the metal profile is a metal rail, wherein the metal rail is advantageously connected to the damper element in a form-fitting manner, in particular by means of a tongue-and-groove connection. The groove is preferably a T-groove. The damper element advantageously extends across the entire length of the support element.

In the case of a further particularly advantageous embodiment of the proposed human transport device, a supporting element as a support element is disposed in the direction of longitudinal extent of the human transport device between the first return station and the second return station, so as to be below the tread elements of the transport region. The supporting element is advantageously configured so as to support in a deformation-free manner a tread element sinking from the transport region and thus to prevent further sinking of the tread element in particular also when the tread element is stressed, thus a user of the human transport device is standing on the tread element, for example. At least one further supporting element for further improving the supporting effect can be provided in parallel with the supporting element.

One further advantageous design embodiment of the proposed human transport device provides that the at least one damper element is a component part of the at least one detection element. It is provided as an advantageous design embodiment in particular that one or a plurality of acceleration sensors is/are disposed on the damper element. The sinking of a tread element onto the damper element herein is detected by the at least one acceleration sensor so that the triggering unit can be triggered.

Independently of how the triggering unit is made to trigger, it is provided in particular that the triggering of the at least one triggering unit triggers a stoppage of the transport belt.

For example, when a step of an escalator thus sinks or breaks, respectively, and consequently acts mechanically on the detection means, the mechanical action is thus identified, for example by a deformation or a deflection of the detection means, and the triggering apparatus is triggered. It is identified in this way that at least one step of the escalator is misplaced. As a further consequence, a stoppage of the escalator is advantageously triggered by the triggering unit, that is to say that the operation of the escalator is stopped.

It is provided in particular that the triggering of the at least one triggering unit triggers a stoppage of the at least one drive unit and/or an activation of at least one brake of the human transport device. A stoppage of the at least one drive unit can be performed in such a manner, for example, that the power supply to the drive unit of the human transport device is interrupted as a reaction to a triggering of the triggering unit, for example in that at least one relay provided to this end is triggered. It can be provided in particular additionally to the stoppage of the drive unit that at least one brake of the human transport device is triggered by the triggering unit. It is prevented in particular in the case of escalators on account thereof that the step belt is moved further by people located on the steps. It is furthermore provided in particular that the stoppage of the transport belt is not performed abruptly but said transport belt is brought to a stop in a delayed manner so as to prevent people on the transport belt falling. In particular, the drive unit, by way of corresponding actuation, can also be employed as a brake.

The human transport device 1 in the exemplary embodiment of a human transport device according to the invention illustrated in FIG. 1 is configured as a travellator. The human transport device 1 comprises a pallet belt as an endless transport belt 2 which is formed by a plurality of interconnected tread elements (not explicitly illustrated in FIG. 1) which in this exemplary embodiment are pallets. The transport belt 2 herein is guided by way of a first return station 6 and a second return station 7 in such a manner that the tread elements of the transport belt 2 are assigned to a transport region 8 or to a return region 9. In the operation of the human transport device 1 users of the human transport device 1 are transported on the tread elements in the transport region 8, whereas the tread elements of the transport belt 2 in the operation of the human transport device 1 in the return region 9 are returned from the end of the transport region 8 back to the beginning of the transport region 8. The transport belt 2 herein is driven by a drive unit 4, for example by an asynchronous motor or a synchronous motor having respective step-up gearboxes.

The human transport device 1 illustrated in FIG. 1 for identifying a faulty arrangement of a tread element in the transport belt 2 comprises a monitoring apparatus 5. A faulty arrangement of a tread element herein is at all times associated with an at least partial sinking of a tread element, in particular caused by a breakage of the tread element or by a breakage of a connection element of a tread element that holds the tread element in the transport belt 2, thus for example a track roller.

The monitoring apparatus of the human transport device 1 shown in FIG. 1 comprises a detection means 10 and a triggering unit 11. The detection means 10 herein in the direction of longitudinal extent of the human transport device 1 is disposed in an equidistant manner between the first return station 6 and the second return station 7, so as to be below the tread elements of the transport region 8 and above the tread elements of the return region 9 and to be centrical in relation to the tread elements.

The detection means 10 in this exemplary embodiment comprises a damper element 24 which is disposed on top of a support element 23, for example a metal rail. Acceleration sensors 30 which are configured to detect measured-acceleration values are disposed herein on the damper element 24. The damper element 24 herein is a vibration transmitter for the acceleration sensors 30.

The detection means 10 is connected to a triggering unit 11 which presently is configured as an electronic control unit (not explicitly illustrated in FIG. 1), wherein the triggering unit detects and evaluates the measured values of the acceleration sensors 30. The connection between the triggering unit 11 and the acceleration sensors 30 can be wired and/or wireless.

Should a tread element of the transport region 8 now be released from the transport belt 2, said tread element therefore drops onto the damper element 24 and thus acts mechanically on the detection means 10. The mechanical action of the tread element on the damper element 24 herein causes a vibration which causes a variation of the measured-acceleration values detected in the case of at least one of the acceleration sensors 30. The triggering unit 11 is triggered at a pre-determined variation of the measured-acceleration values. To this end, the triggering unit 11 can have a comparator unit (not illustrated in FIG. 1) which compares the measured-acceleration values detected with a pre-determined measured-acceleration value as the limit value.

If a detected measured-acceleration value exceeds the pre-determined measured-acceleration value, that is to say if a measured-acceleration value has been varied in a pre-determined way, the triggering unit 11 is triggered. The monitoring installation has thus identified a faulty arrangement of a tread element in the transport belt 2. An interruption of the power supply to the drive unit 4 is performed by the triggering of the triggering unit 11 in the exemplary embodiment, such that the drive unit 4 is stopped. The triggering unit 11 in the exemplary embodiment additionally triggers a brake 16 of the human transport device 1. The triggering unit 11 is thus configured to bring the transport belt 2 to a stop by actuating the drive unit 4 and/or the brake 16 in a corresponding manner.

Figure 2:
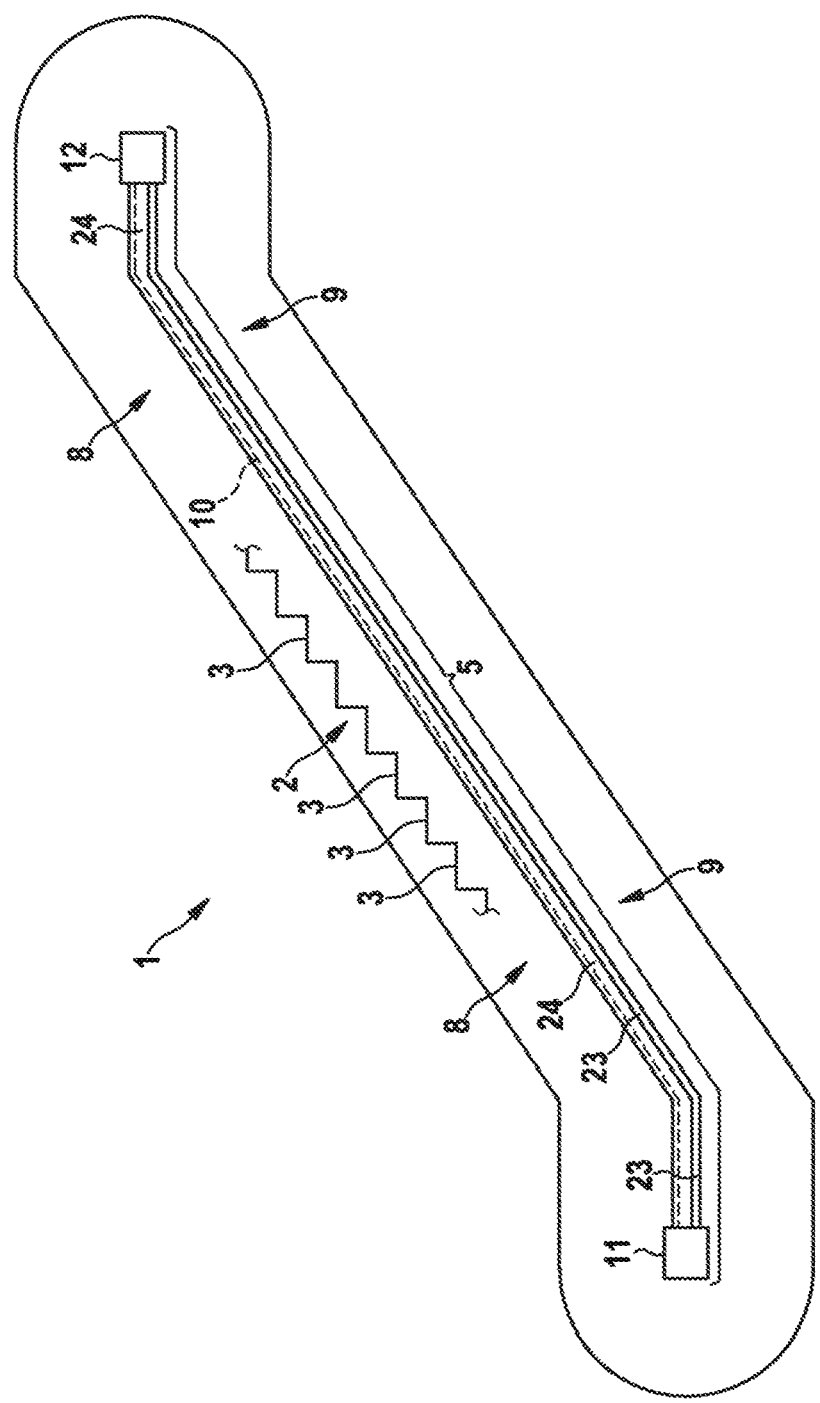
FIG. 2 is a schematic view of another example human transport device.

The exemplary embodiment schematically illustrated in FIG. 2 represents an escalator as the human transport device 1. The human transport device 1 herein as the transport belt 2 has an endless step belt formed by steps as tread elements 3, wherein for the sake of clarity only a fragment of the step belt is illustrated. As is usual in the case of an escalator, the transport belt 2 between a first return station (not explicitly illustrated in FIG. 2) and a second return station (not explicitly illustrated in FIG. 2) runs through a transport region 8 and a return region 9. As is usual in the case of an escalator, the transport belt 2 is driven by a drive unit (not explicitly illustrated in FIG. 3).

The human transport device 1 illustrated in FIG. 2 has a monitoring apparatus 5 for identifying a faulty arrangement of at least one tread element 3 in the transport belt 2. To this end a detection means 10 is disposed at a minor spacing below the tread elements 3 that are accessible to users of the human transport device 1, that is to say between the tread elements 3 of the transport region and the tread elements of the return region 9, so as to be between a first triggering unit 11 and a second triggering unit 12. Connected to the detection means 10 herein are a first triggering unit 11 and a second triggering unit 12.

It is provided herein that a signal which is received by one of the triggering units 11, 12, or by both triggering units 11, 12, and causes the triggering units 11, 12 to be triggered is generated in the event of a mechanical action on the detection means 10.

The detection means 10 herein can be configured as has been explained in the context of FIG. 1, for example.

A further design variant will moreover be described hereunder with reference to FIG. 2. The detection means 10 in the case of this design variant is formed from a mechanically tensioned cable which is deflected in the event of a mechanical action, wherein the triggering unit 11 and/or the triggering unit 12 are/is triggered at a pre-determined deflection.

The cable herein is guided within a damper element 24, to which end the damper element 24 has a respective receptacle space as will be explained later in the context of FIG. 6. In order to prevent bending or buckling, respectively, of the damper element 24 in the upper region and in the lower region of the human transport device 1, it can be provided in particular that the damper element 24 is formed by at least three damper elements, having one damper element in the lower region, one further damper element in the upper region, and at least one further damper element in the ascending region between the upper region and the lower region.

The damper element 24 herein in this design variant is configured as an elastically deformable damper part of plastic. The damper element 24 furthermore has a compression space as will be explained in more detail later with reference to FIG. 6.

The damper element 24 is disposed on top of a support element 23, wherein the support element 23 is configured as a supporting element. The supporting element can in particular be a steel support. The supporting element herein advantageously supports a tread element that has been released from the transport region 8 and prevents in particular that such a tread element is released completely from the transport belt 2, forming an opening into which people could fall.

With respect to this design variant, the triggering units 11, 12 can be configured in particular as micro switches which are connected to the cable ends of the detection means 10. The micro switches herein open when the detection means 10 is deflected as a result of a faulty arrangement of a tread element 3 and the mechanical action on the detection means 10 associated therewith arising. The opening of the micro switch herein represents the triggering of the respective triggering unit 11, 12. Various measures which convert the escalator in particular to a safe operating state can be triggered herein by way of the opening of the micro switch. Such measures are in particular a deceleration of the transport belt 2 and a stopping of the drive unit of the escalator.

Figure 3:
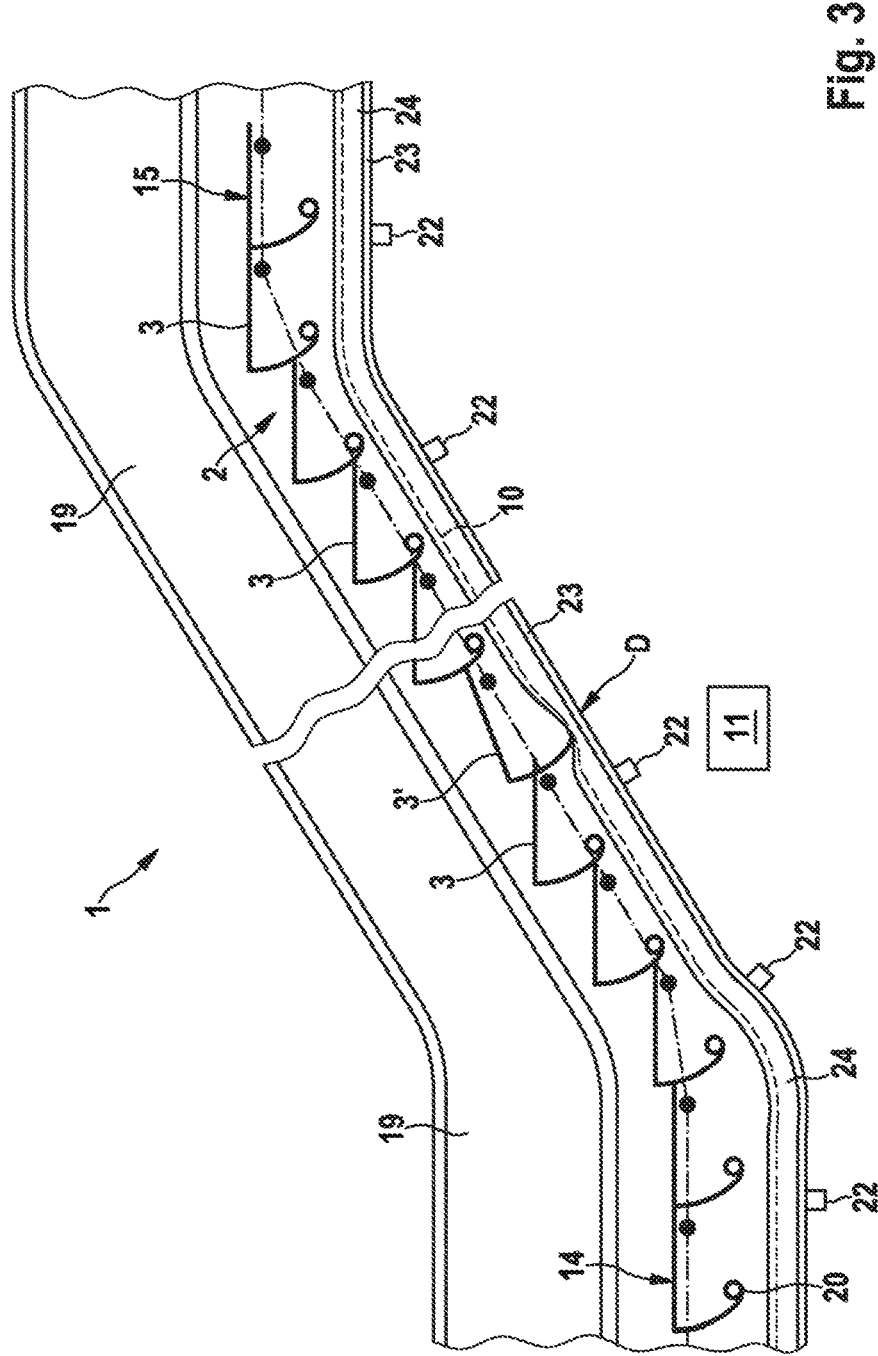
FIG. 3 is a schematic view of a fragment of another example human transport device.

The human transport device 1 illustrated in fragments in FIG. 3 in turn is an escalator having a transport belt 2 that is formed from steps as tread elements 3. Only the accessible transport region of the transport belt 2 and not the return region of the transport belt 2 herein is illustrated in FIG. 3. In particular, the human transport device 1 in the central region is illustrated in a shortened manner (symbolically illustrated in FIG. 3 by the section lines disposed in a centrical manner). For reasons of improved clarity, there is likewise no explicit illustration in FIG. 3 of the drive unit and of the return stations in which the changeover from the transport region to the return region, or from the return region to the transport region, respectively, is performed. The human transport device 1 illustrated in FIG. 3 connects in each case one first height level 14 to a second, higher height level 15, thus for example two floors of a building. A balustrade 19 with a handrail is likewise schematically illustrated.

The human transport device 1 furthermore has a monitoring apparatus for identifying a faulty arrangement of at least one tread element, said monitoring apparatus comprising a detection means 10 and a triggering unit 11 that is connected to the detection means 10 (the connection is not explicitly illustrated in FIG. 3).

The human transport device 1, as is usual in the case of an escalator, furthermore has a support structure (not explicitly illustrated in FIG. 3) in which the transport belt 2 is guided. The human transport device 1 on cross stays 22 of the support structure has a metal rail as the support element 23. The support element 23 herein is advantageously disposed in an equidistant manner below the transport belt 2. The support element 23 can be curved in a corresponding manner for the equidistant arrangement below the transport belt 2. A damper element 24 as is explained in more detail with reference to FIG. 4, for example, is disposed on top of this support element 23. The damper element 24 herein can be configured as will be explained in more detail in the context of FIG. 6. It is provided in particular that a detection means 10 is disposed within the damper element 24. The detection means 10 herein can in particular be a capacitive proximity sensor or an inductive proximity sensor or a resistance sensor. The detection means 10 herein supplies a signal to the triggering unit 11. The detection means 10 herein extends in particular across the entire length of the damper element 24. It is furthermore provided in particular that the detection means 10 tracks the profile of the damper element 24, or the profile of the support element 23, respectively.

A faulty arrangement of a tread element 3' in the transport belt 2 is furthermore shown in FIG. 3. For example, the suspension of the track rollers 20 of the tread element 3' can have broken off, on account of which the tread element 3' has sunk and acts mechanically on the damper element 24 and thus also on the detection means 10 that is disposed in the damper element 24. The reference sign D in FIG. 3 herein points toward the elastic deformation of the damping element 24 that arises as a consequence of the mechanical action. The support element 23 herein supports the tread element 3' such that the latter does not fall completely out of the transport belt 2, thus preventing that an opening is released in the transport belt 2. The signal that is transmitted to the triggering unit is varied on account of the mechanical action on the detection means 10. Depending on the design embodiment of the detection means 10, a capacitance variation or an induction variation or a resistance variation arises such that the transmitted signal is correspondingly varied. The triggering unit 11 is triggered at a pre-determined signal variation, in particular when pre-determined signal values that are transmitted to the triggering unit 11 are exceeded.

Figure 4:
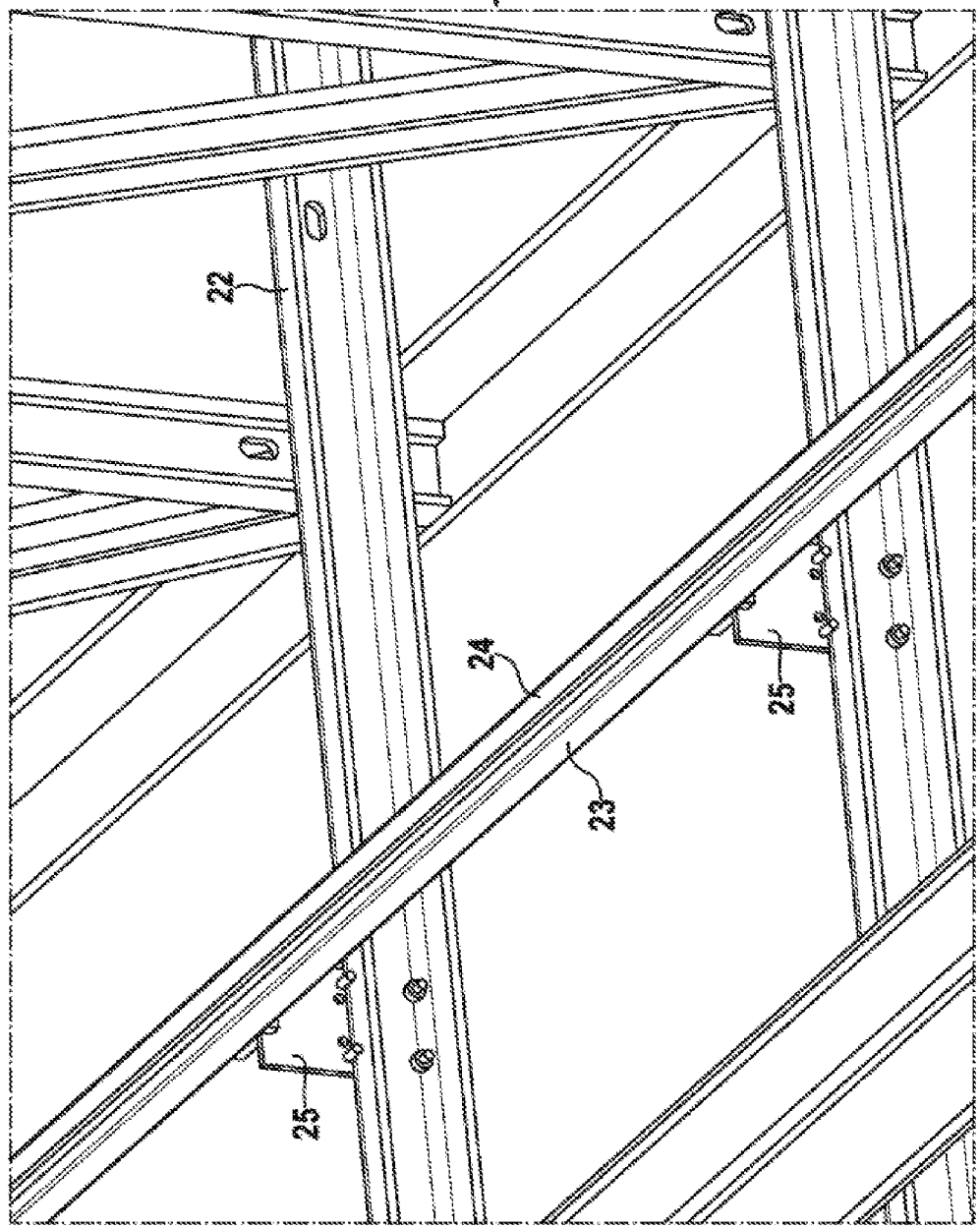
FIG. 4 is a schematic view of an example arrangement of a damper element for configuring a human transport device.

FIG. 4 in an exemplary manner shows the attachment of the support element 23 to the support structure 21 of a human transport device. The lattice structure of the support structure 21 herein comprises in particular cross stays 22 which are disposed so as to be orthogonal to the direction of longitudinal extent of the support structure 21 and thus orthogonal to a human transport device which comprises such a support structure 21. A support element 23, for example a square tube, is disposed on these cross stays 22 by way of connection elements 25. The connection between the connection element 25 and the cross stay 22, and the connection between the connection element 25 and the support element 23, can be performed in particular by screw-fitting or welding. A damper element 24 is furthermore disposed on the support element 23. To this end, the damper element 24 can have a metal rail which is assembled on the support element 23, wherein an elastically deformable damper part is fixedly connected to the metal rail, in particular by means of a tongue-and-groove connection as shown in FIG. 6, for example.

Figure 5:
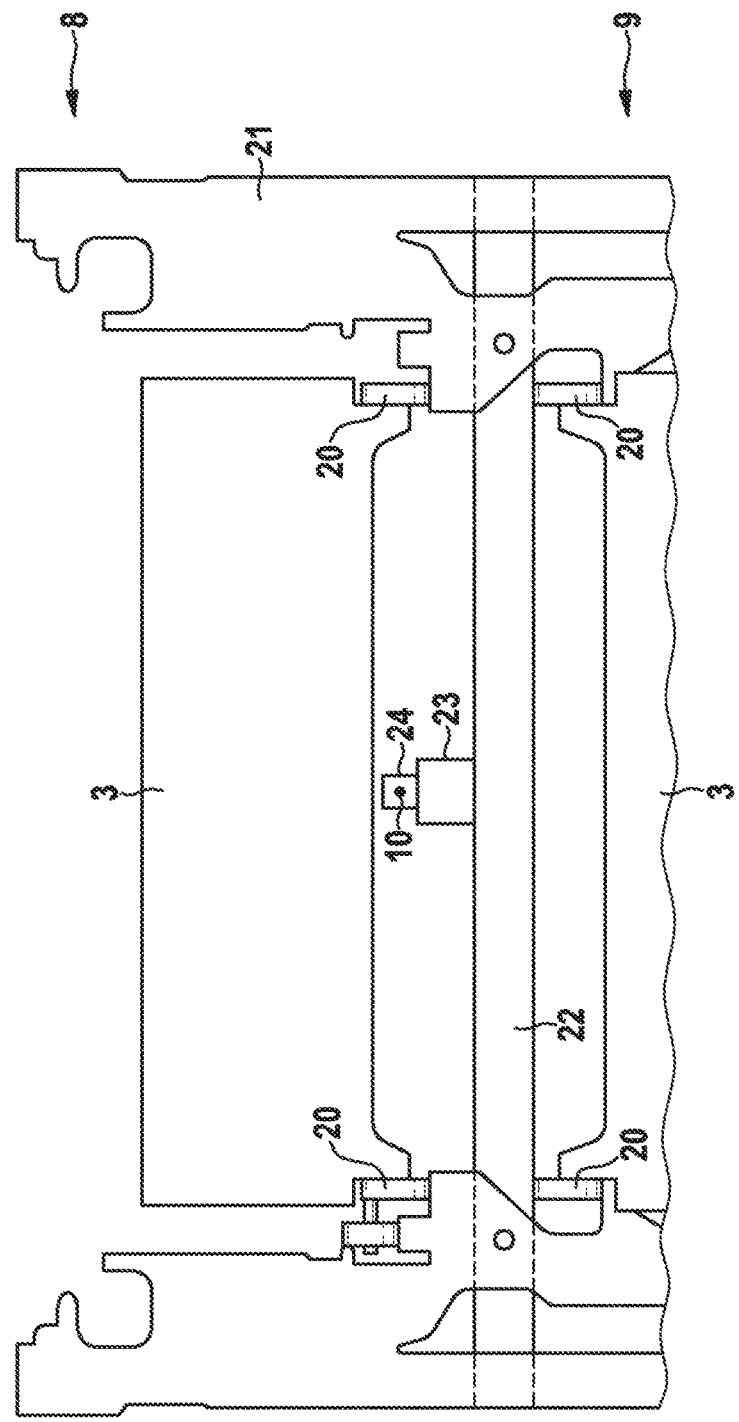
FIG. 5 is a schematic view of a fragment of still another example human transport device.

FIG. 5 in a cross section shows a part-region of a human transport device. A support structure 21 of a human transport device in which the transport belt is guided is illustrated herein. A step as a tread element 3 in the transport region 8 and part of a step as a tread element 3 in the return region 9 can be seen herein. The tread elements 3 herein have track rollers 20 which run on corresponding guides. A detection means 10 for detecting a tread element that is misplaced in the transport belt herein is disposed at a minor spacing, for example a spacing between 1 cm and 10 cm (cm: centimeter), in particular a spacing between 3 cm and 6 cm, below the tread elements 3 in the transport region 8, so as to be centric in relation to the tread elements 3 in the direction of longitudinal extent of the human transport device. The detection means 10 herein is disposed in a damper element as will be explained in more detail in particular in the context of FIG. 6.

Should a tread element 3 drop, for example because a track roller 20 breaks, said tread element 3 thus impacts the detection means 10. The support element 23 herein effects that the tread element does not drop any further. The tread element 3, by impacting the detection means 10, triggers a triggering unit, for example a correspondingly programmed micro-controller circuit (not explicitly illustrated in FIG. 5).

Figure 6:
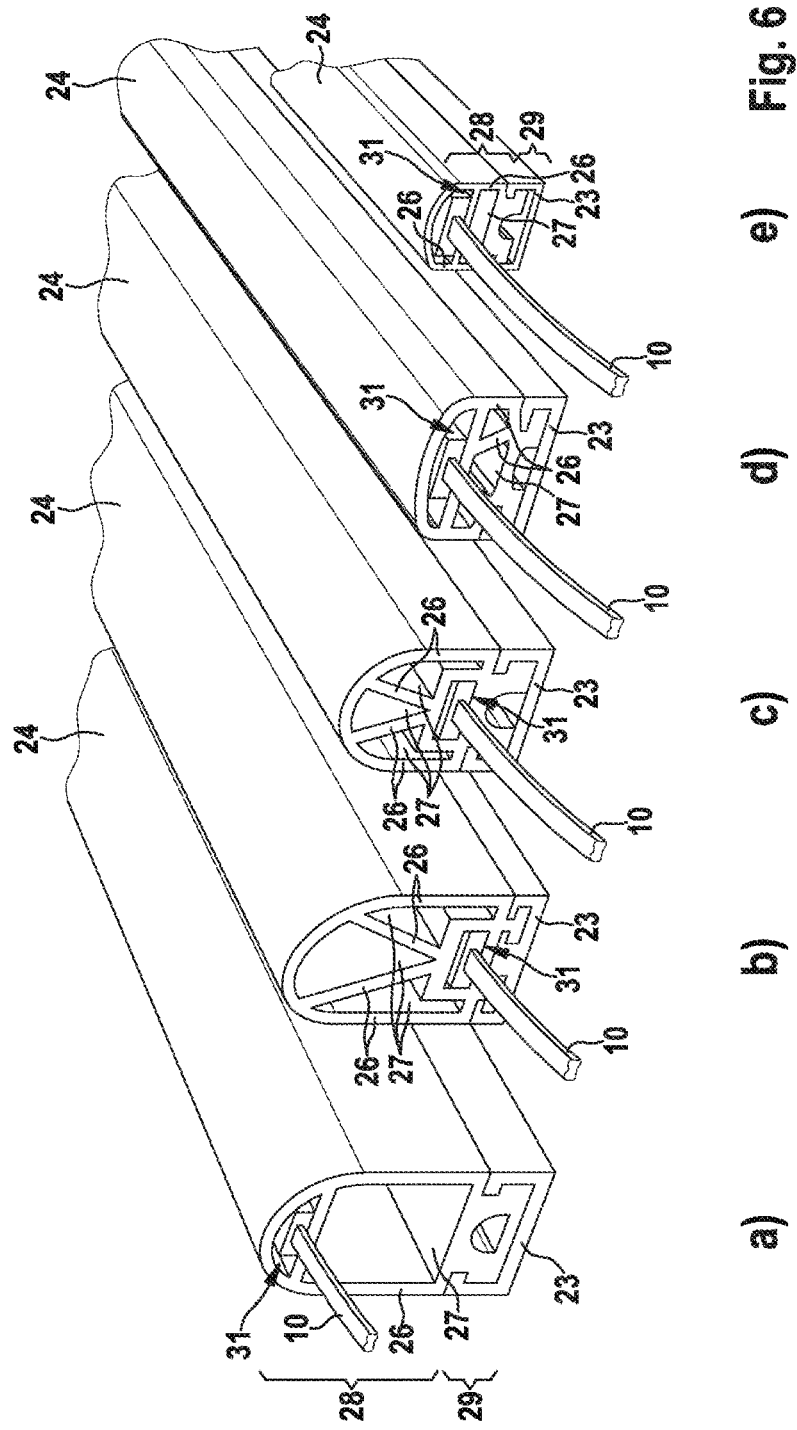
FIG. 6 is a perspective view of example detection means in example damper elements for configuring a human transport device.

Advantageous embodiments a) to e) of damper element 24 in which a detection means 10 is disposed are illustrated in FIG. 6. The damper elements 24 herein, as is illustrated in FIG. 6, are connected to a support element 23 that is configured as a metal rail by way of advantageous form-fitting connections, in particular T-shaped tongue-and-groove connections. The connection herein is established by way of a correspondingly shaped attachment part 29 of the damper element 24, which extends across the entire length of the respective damper element 24. The damper elements 24 moreover comprise in each case one damper part 28 which extends across the longitudinal extent of the damper element 24 and is configured so as to be elastically deformable. It is provided in particular that the damper part 28, like the attachment part 29, herein is made from a plastic.

The damper part 28 of the damper elements 24 herein has in each case at least two support walls 26, a compression space 27 being configured therebetween in the direction of longitudinal extent of the respective damper element 24. This compression space 27 herein is compressed in the event of a mechanical action on the respective damper element 24 from above, thus in particular by a sinking tread element.

The damper element 24 in the case of the exemplary embodiments illustrated in FIG. 6 moreover has a receptacle space 31 which in each case extends across the length of the damper element 24 and in which in each case one detection means 10 is disposed. As has already been discussed above, the detection means 10 can be embodied in different ways. In any case, the detection means 10 is configured such that a mechanical action on the damper element 24 and thus also on the detection means 10 causes a triggering unit (not illustrated in FIG. 6) to be triggered. This can be performed in particular indirectly by a deflection of the detection means, said deflection, for example in the design embodiment of the detection means as a capacitive proximity sensor, causing a variation in the capacitance. Accordingly, a variation in the induction is caused in the case of an inductive proximity sensor, and a variation in the resistance is caused in the case of a resistance sensor.

In the case of a design embodiment in which the detection means comprises an elastically deformable light conductor, the latter is disposed in the receptacle space 31. An optical signal is fed at one end of the light conductor in this instance, said optical signal at the other end of the light conductor being received by an optical sensor. In the event of a mechanical action on the damper element 28 and thus in the event of a mechanical action on the light conductor, the optical signal received by the optical sensor is varied, on account of which the triggering unit is made to trigger. Accordingly, a detected flow in the case of the use of a fluid-perfused hose instead of the light conductor and of a flow sensor instead of the optical sensor would also be varied in the event of a mechanical action, this leading to the triggering unit being triggered.

A cable as a further design embodiment of the detection means 10 can be routed through the receptacle space 31. The cable herein is mechanically tensioned and at least at one end connected to a strain sensor or to a micro switch as the triggering unit, the latter opening when the cable is deflected by virtue of a mechanical action. The triggering herein is performed by opening the switch. The detection means is advantageously disposed at the top in the damper element 24 as is illustrated, for example, in FIGS. 6a), d), and e).

Figure 7:
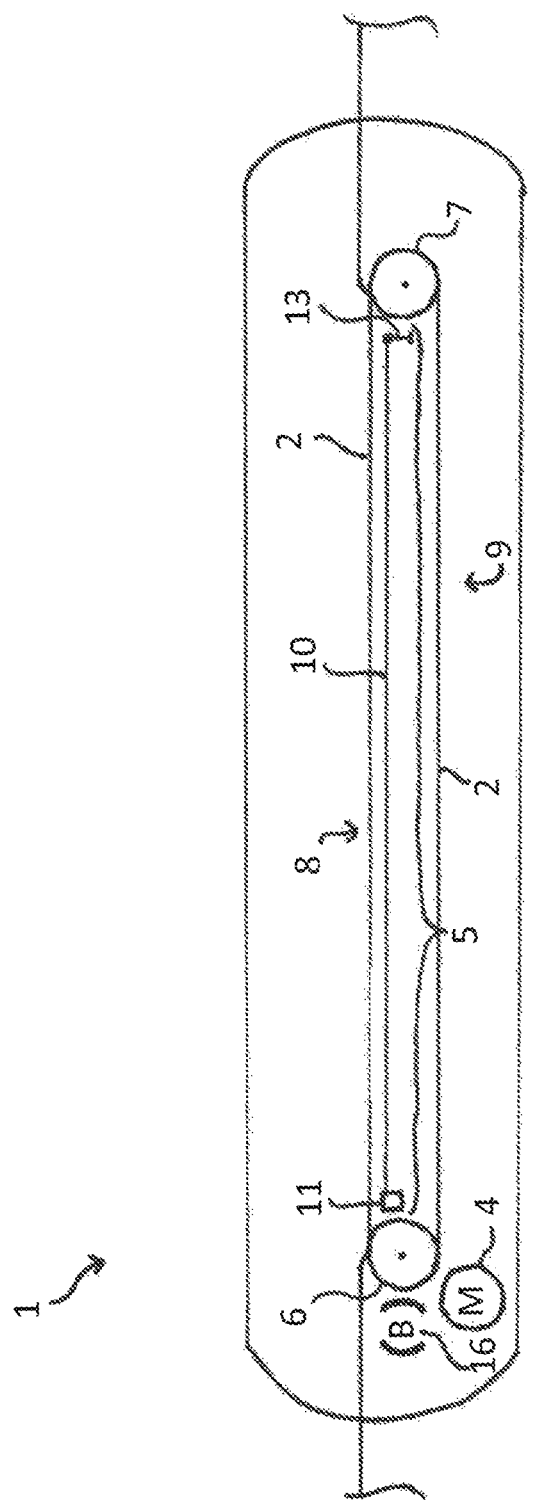
FIG. 7 is a schematic view of yet another example human transport device.

The human transport device 1 in the exemplary embodiment of a human transport device according to the invention illustrated in FIG. 7 is configured as a travellator. The human transport device 1 comprises a pallet belt as an endless transport belt 2 which is formed by a plurality of interconnected tread elements (not explicitly illustrated in FIG. 7) which in this exemplary embodiment are pallets. The transport belt 2 herein is guided by way of a first return station 6 and a second return station 7, such that the tread elements of the transport belt 2 a transport region 8 in which users of the human transport device 1 are transported in the operation of the human transport device 1, and a return region 9 in which the tread elements of the transport belt 2 in the operation of the human transport device 1 are returned from the end of the transport region 8 back to the beginning of the transport region 8. The transport belt 2 herein is driven by a drive unit 4, for example by an asynchronous motor or a synchronous motor having respective step-up gearboxes.

The human transport device 1 illustrated in FIG. 7 comprises a monitoring apparatus 5 for identifying a faulty arrangement of a tread element in the transport belt 2. A faulty arrangement of a tread element herein is at all times associated with an at least partial sinking of a tread element, in particular caused by a breakage of the tread element or of the connection between two tread elements.

The monitoring apparatus 5 of the human transport device 1 shown in FIG. 7 is disposed between the first return station 6 and the second return station 7. The monitoring apparatus 5 in this exemplary embodiment herein comprises a detection means 10 configured as a wire cable, a triggering unit 11 which in the exemplary embodiment is configured as a micro switch, and a holding element 13 which in the exemplary embodiment is configured as a metal hook.

The detection means 10 herein, in the direction of longitudinal extent of the human transport device 1, is disposed between the first return station 6 and the second return station 7, and between the transport region 8 and the return region 9, thus in particular below the tread elements of the transport region 8. The detection means 10 herein between the triggering unit 11 and the holding element 13 is furthermore mechanically tensioned in a manner centrical to the transport belt 2.

Should a tread element now sink, for example by virtue of a breakage in the connection between two neighboring tread elements, the tread element thus sinks onto the detection means 10, the detection means 10 being deflected on account thereof. The micro switch opens on account of the deflection of the detection means, that is to say that the triggering unit 11 is triggered. A faulty arrangement of a tread element in the transport belt 2 is thus identified. An interruption of the power supply to the drive unit 4 such that the drive unit 4 is stopped is performed by opening the micro switch, thus by triggering the triggering unit 11. The opening of the micro switch additionally triggers a brake 16 of the human transport device 1. The triggering unit 11 is thus configured to bring the transport belt 2 to a stop.

Figure 8:
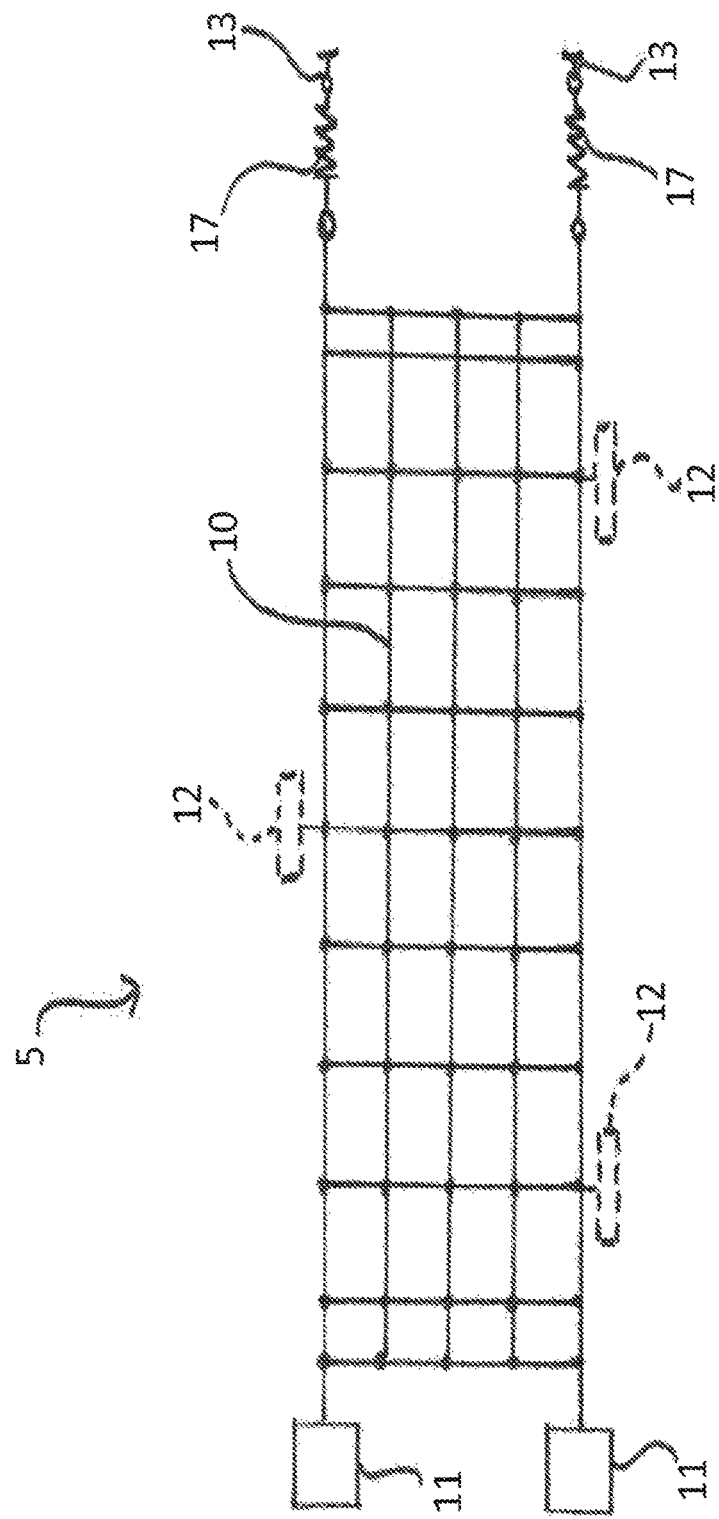
FIG. 8 is a schematic view of an example human transport device.
Figure 9:
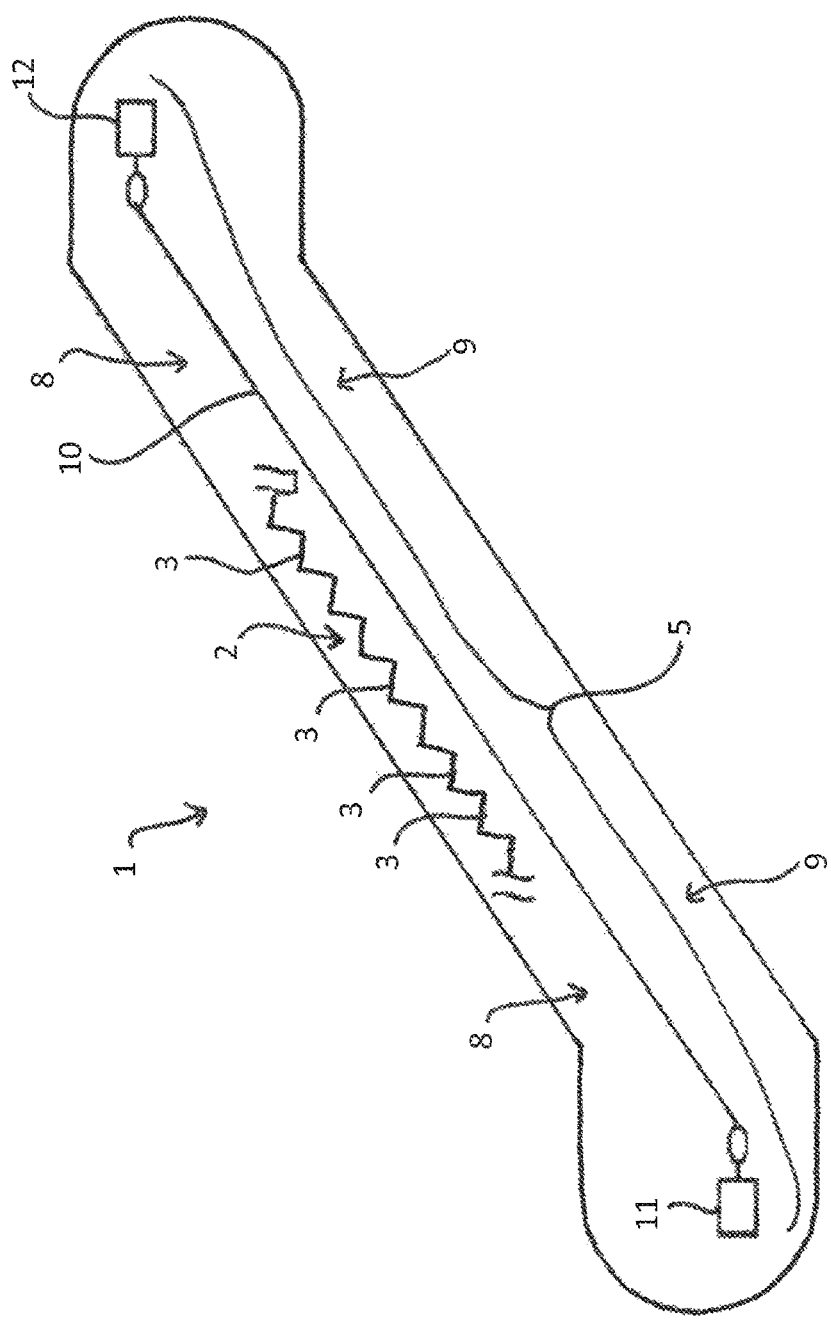
FIG. 9 is a schematic view of a further example human transport device.

The exemplary embodiment of a monitoring apparatus 5 shown in FIG. 8 is an advantageous variant of design embodiment of such a monitoring apparatus and could be alternatively used for example in the human transport device illustrated in FIG. 7 or FIG. 9, respectively.

The monitoring apparatus 5 herein comprises a detection means 10 which is configured from a plurality of cables so as to form a net. The cables herein can be steel cables, in particular. The net width herein is advantageously dimensioned such said net corresponds to the width of the tread elements of the human transport device in which the monitoring apparatus 5 is to be employed. A particularly positive identification capability of misplaced tread elements is enabled on account thereof.

The detection means 10 is disposed under tensile stress between triggering units 11 and holding elements 13. Mechanical springs by way of which a consistent tensile stress of the detection means 10 is to be ensured are disposed herein as compensation means 17 between the detection means 10 and the holding elements 13. A decrease of the tensile stress of the tensioned detection means 10, caused by material expansion, is in particular to be compensated for by the compensation means 17. Further triggering units 12 are provided laterally of the detection means 10, beside the triggering units 11 opposite the holding elements. The triggering units 11, 12 are in each case configured to be triggered in the event of a deflection of the detection means 10, thus when a tread element by virtue of a faulty arrangement in the transport belt presses on the detection means. The lateral triggering units 12 herein can further improve the identification of a faulty arrangement of a tread element. These triggering units can in particular also be utilized for rendering plausible results supplied by the triggering units 11. It can be provided in particular that the triggering units 11 are configured as strain sensors, and the lateral triggering units are configured as micro switches.

According to one advantageous design embodiment, the triggering units 11 are moreover configured to be triggered in the event of a rupture of the detection means, thus when the tensile stress of the detection means 10 abruptly decreases. This is advantageous in particular when the cables of the detection means 10 are configured to be very thin, for example having a cross section of less than two millimeters, and a broken tread element could break through the detection means 10. A faulty arrangement of the tread element is reliably identified in this way even in this scenario.

The exemplary embodiment shown in FIG. 9 represents an escalator as the human transport device 1. The human transport device 1 herein as the transport belt 2 has an endless step belt that is formed from steps as tread elements 3, wherein for the sake of improved clarity only a fragment of the step belt is illustrated. As is usual in the case of an escalator, the transport belt 2 between a first return station (not explicitly illustrated in FIG. 9) and a second return station (not explicitly illustrated in FIG. 9) runs through a transport region 8 and a return region 9. The transport belt 2, as is usual in the case of an escalator, is driven by a drive unit (not explicitly illustrated in FIG. 9).

The human transport device 1 illustrated in FIG. 9 has a monitoring apparatus 5 for identifying a faulty arrangement of at least one tread element 3 in the transport belt 2. To this end, a cable as the detection means 10 is tensioned at a minor spacing below the tread elements 3 that are accessible by users of the escalator, thus below the tread elements 3 of the transport region 8, between a first triggering unit 11 and a second triggering unit 12. The triggering unit 11 and the triggering unit 12 herein are disposed between the first return station and the second return station. The triggering units 11, 12 herein are configured as micro switches which open when the detection means 10 is deflected as a consequence of a faulty arrangement of a tread element 3, in particular of a breakage of a step, arising. The opening of the micro switch herein represents the triggering of the respective triggering unit 11, 12. Various measures which convert the escalator in particular to a safe operating state can be triggered herein by opening the micro switch. Such measures are, in particular, braking the transport belt 2, and stopping the drive unit of the escalator.

Figure 10:
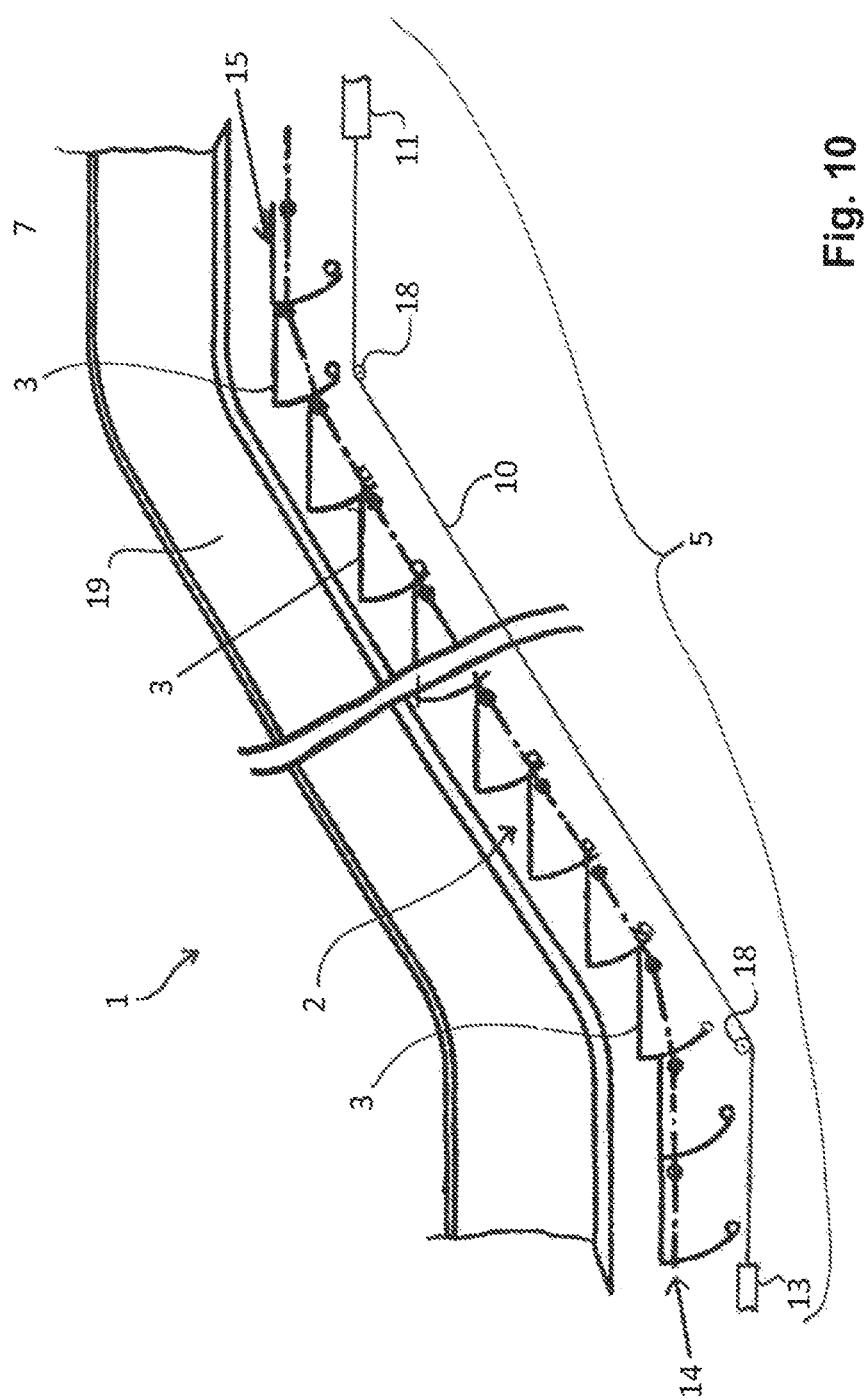
FIG. 10 is a schematic view of a still further example human transport device.

The exemplary embodiments illustrated in FIG. 10 and FIG. 11 likewise relate to escalators as human transport devices. The escalators herein in FIG. 10 and FIG. 11 are in each case illustrated so as to be shortened in the central region (symbolically illustrated by the centrally disposed section lines in FIG. 10 and FIG. 11). The escalators, as is usual in the case of escalators, herein have a balustrade 19 with a handrail. The human transport devices 1 as the transport belt 2 in turn have a step belt which is formed from a plurality of steps as tread elements 3. Only the accessible transport region of the transport belt and not the return region of the transport belt is illustrated herein in FIG. 10 and FIG. 11. There is no explicit illustration of the drive unit and of the return stations in which the changeover from the transport region to the return region, or from the return region to the transport region, respectively, is performed in FIG. 10 and FIG. 11. The human transport devices 1 illustrated in FIG. 10 and FIG. 11 connect in each case one first height level 14 to a second, higher height level 15, thus for example two floors of a building.

The human transport devices 1 herein have in each case one monitoring apparatus 5 for identifying a faulty arrangement of the tread elements 3 in the transport belt 2, thus a faulty arrangement of the steps in the step belt.

In the case of the human transport device 1 illustrated in FIG. 10, the monitoring apparatus 5 comprises a detection means 10 that is disposed below the step belt. The detection means 10 herein is configured from a cable which is tensioned between a holding element 13, for example a metallic eyelet, and a triggering unit 11. The holding element herein is disposed on the first height level 14, and the triggering unit is disposed on the second height level 15.

Since the transport belt 2 of the human transport devices 1 in the transport region runs in different planes, the human transport device 1 has deflection means 18 by way of which the detection means 10 is guided. The deflection means 18 in the exemplary embodiment shown are implemented as deflection rollers. These effect that the detection means 10 is uniformly tensioned. Moreover, a substantially consistent spacing between the tread elements 3 and the detection means 10 is advantageously maintained by the deflection means 18.

The exemplary embodiment illustrated in FIG. 11 differs from the exemplary embodiment illustrated in FIG. 10 in particular in that the detection means 10 in FIG. 11 is tensioned between a first triggering unit 11 and a second triggering unit 12.

FIG. 11 moreover shows a faulty arrangement of a tread element 3 in the transport belt 2. It can be provided herein in the exemplary embodiment that the suspension of the track rollers 20 of a step 3' have broken off. The step 3' has sunk on account thereof and herein deflects the detection means 10. As an illustration for comparison purposes, the non-deflected detection means 10' is illustrated in FIG. 11. The deflection of the detection means 10 herein is identified by at least one of the triggering units 11, 12 to which the detection means 10 is connected, such that at least one of the triggering units 11, 12 is triggered, or else both triggering units 11, 12, are triggered.

The exemplary embodiments illustrated in the figures and explained in the context of said figures serve for explaining the invention and do not limit the latter. In particular, the features illustrated in the figures are not reflected true-to-scale but merely in an illustrative manner in order for the invention to be visualized.

LIST OF REFERENCE SIGNS

1 Human transport device
2 Transport belt
3 Tread element
3' Misplaced tread element
4 Drive unit
5 Monitoring apparatus
6 First return station
7 Second return station
8 Transport region
9 Return region
10 Detection means
11 First triggering unit
12 Second triggering unit
13 Holding element
14 First height level
15 Second height level
16 Brake
17 Compensation means
18 Deflection means
19 Balustrade with handrail
20 Track roller
21 Support structure
22 Cross stay
23 Support element
24 Damper element
25 Connection element
26 Support wall
27 Compression space
28 Damper part
29 Attachment part
30 Sensor
31 Receptacle space
D Deformation of the damper element

What is claimed is:

1. A human transport device comprising:
   tread elements that are connected so as to form an endless transport belt, wherein between a first return station and a second return station the tread elements of the endless transport belt run through a transport region and a return region;
   a drive unit for driving the endless transport belt; and
   a monitoring apparatus at least for identifying a faulty arrangement in the transport region of at least one of the tread elements of the endless transport belt, wherein the monitoring apparatus comprises
   a triggering unit, and
   a detection means that is connected to the triggering unit, wherein the triggering unit is configured to be triggered in an event of a mechanical action on the detection means, wherein the detection means in a direction of longitudinal extent of the human transport device is disposed between the first return station and the second return station so as to be below the tread elements of the transport region.

2. The human transport device of claim 1 wherein the detection means is disposed between the first return station and the second return station so as to be centric to the tread elements.

3. The human transport device of claim 1 wherein the detection means under tensile stress is disposed between the first return station and the second return station so as to be below the tread elements of the transport region, wherein the triggering unit is configured to be triggered in an event of a deflection of the detection means by a mechanical action on the detection means.

4. The human transport device of claim 3 wherein the triggering unit is a first triggering unit, the monitoring apparatus further comprising a second triggering unit, wherein the detection means is tensioned between the first and second triggering units.

5. The human transport device of claim 3 wherein the triggering unit is configured to be triggered by a decrease in tensile stress of the detection means.

6. The human transport device of claim 3 wherein the detection means is tensioned between a holding element and the triggering unit.

7. The human transport device of claim 6 wherein the human transport device connects a first height level to a second height level, wherein the second height level is higher than the first height level, wherein the triggering unit is disposed in a region of the second height level.

8. The human transport device of claim 6 further comprising a compensation means for compensating a decrease in tensile stress of the tensioned detection means.

9. The human transport device of claim 1 wherein the detection means comprises a mechanically-tensioned cable that is deflected in the event of the mechanical action, wherein the triggering unit is triggered at a predetermined deflection.

10. The human transport device of claim 1 wherein the endless transport belt in the transport region runs in at least two different planes, wherein the human transport device comprises a deflection means by way of which the detection means is guided such that a uniform spacing between the tread elements and the detection means is maintained in the at least two different planes.

11. The human transport device of claim 1 wherein the triggering unit is a micro switch, a strain sensor, or a control apparatus.

12. The human transport device of claim 1 wherein the at least one detection means comprises a capacitive proximity sensor, a capacitance thereof varying in the event of the mechanical action on the detection means, wherein the triggering unit is triggered at a predetermined capacitance variation, and/or in that the detection means has an inductive proximity sensor, an induction thereof varying in the event of the mechanical action on the detection means, wherein the triggering unit is triggered at a predetermined induction variation, and/or in that the detection means has a resistance sensor, a resistance thereof varying in the event of the mechanical action on the detection means, wherein the least one triggering unit is triggered at a predetermined resistance variation, and/or in that the detection means comprises an optical sensor comprising an elastically deformable light conductor, measured values thereof varying in the event of the mechanical action on the light conductor, wherein the triggering unit is triggered at a predetermined measured-value variation, and/or in that the detection means comprises a flow sensor comprising a fluid-perfused elastically deformable hose, measured-flow values thereof varying in the event of the mechanical action on the fluid-perfused elastically deformable hose, wherein the triggering unit is triggered at a predetermined variation of the measured-flow values, and/or in that the detection means comprises an acceleration sensor that is disposed on a vibration transmitter, measured-acceleration values of the acceleration sensor varying in the event of the mechanical action on the vibration transmitter, wherein the triggering unit is triggered at a predetermined variation of the measured acceleration values.

13. The human transport device of claim 1 wherein the detection means is disposed on or within a damper element that is disposed between the first return station and the second return station so as to be below the tread elements of the transport region.

14. The human transport device of claim 13 wherein the damper element comprises a damper part from an elastically deformable material that extends across a longitudinal extent of the damper element.

15. The human transport device of claim 14 wherein the damper part comprises:
   at least two lateral support walls; and
   a compression space that is compressed in an event of a mechanical action on the damper element by a sinking tread element, wherein the compression space is configured in a direction of the longitudinal extent of the damper element so as to be between the at least two lateral support walls.

16. The human transport device of claim 13 wherein the damper element is disposed on a support element.

17. The human transport device of claim 16 further comprising a support structure in which the endless transport belt is guided, wherein the support element is disposed on the support structure.

18. The human transport device of claim 16 wherein a supporting element as the support element is disposed in the direction of the longitudinal extent of the human transport device between the first and second return stations so as to be below the tread elements of the transport region.

19. The human transport device of claim 1 wherein the detection means is disposed in an equidistant manner between the first and second return stations so as to be below the tread elements of the transport region.

20. The human transport device of claim 1 wherein triggering of the triggering unit causes at least one of stoppage of the endless transport belt, stoppage of the drive unit, or activation of a brake of the human transport device.

* * * * *